(12) United States Patent
Morand

(10) Patent No.: US 6,454,897 B1
(45) Date of Patent: Sep. 24, 2002

(54) METHOD FOR MANUFACTURING A FLEXIBLE DUCT

(75) Inventor: Michel Paul Morand, Duclair (FR)

(73) Assignee: Coflexip (FR)

( * ) Notice: Subject to any disclaimer, the term of this patent is extended or adjusted under 35 U.S.C. 154(b) by 0 days.

(21) Appl. No.: 09/214,026
(22) PCT Filed: Aug. 22, 1997
(86) PCT No.: PCT/FR97/01518
§ 371 (c)(1), (2), (4) Date: Dec. 23, 1998
(87) PCT Pub. No.: WO98/09106
PCT Pub. Date: Mar. 5, 1998

(30) Foreign Application Priority Data

Aug. 27, 1996 (FR) .............................. 96 10490

(51) Int. Cl.⁷ .............................................. B29C 47/02
(52) U.S. Cl. .......................... 156/244.13; 156/244.15; 156/144
(58) Field of Search ................. 156/143, 144, 156/244.13, 244.14, 191, 195, 244.11, 244.15, 244.23, 244.25; 264/171.22, 171.12, 171.13, 171.14, 171.16, 171.2, 171.26; 138/138, 139, 144, 147

(56) References Cited

U.S. PATENT DOCUMENTS

| | | | |
|---|---|---|---|
| 3,311,133 A | 3/1967 | Kinander | 138/136 |
| 3,318,338 A | 5/1967 | Craig | 138/131 |
| 3,687,169 A | 8/1972 | Reynard | 138/134 |
| 4,952,262 A | * 8/1990 | Washkewicz et al. | 156/149 |

FOREIGN PATENT DOCUMENTS

| | | |
|---|---|---|
| EP | 0246019 | 11/1987 |
| FR | 2136974 | 2/1974 |
| FR | 2268614 | 10/1976 |
| FR | 2569462 | 2/1986 |
| JP | 58183233 | 10/1983 |
| WO | 92/02751 | 2/1992 |
| WO | 95/24578 | 9/1995 |

* cited by examiner

Primary Examiner—Michael W. Ball
Assistant Examiner—Gladys Piazza
(74) Attorney, Agent, or Firm—Ostrolenk, Faber, Gerb & Soffen, LLP

(57) ABSTRACT

It is of the type comprising, from the inside to the outside, a flexible metal tube 2 having a helical winding of turns, an internal sealing sheath 3 arranged around the said flexible metal tube, at least one armouring ply 5 wound around the said internal sealing sheath and at least one external sealing sheath 7, the internal sealing sheath being extruded onto the flexible metal tube using extrusion means, characterized in that it furthermore consists in heating the said flexible metal tube 2 upstream of the extrusion means and to a temperature below 100° C.

11 Claims, 3 Drawing Sheets

METHOD FOR MANUFACTURING A FLEXIBLE DUCT

BACKGROUND OF THE INVENTION

The present invention relates to a process for manufacturing a flexible pipe which can be used for transporting fluids such as, for example, hydrocarbons.

Several types of flexible pipes are used. Some flexible pipes comprise, from the inside to the outside, an internal sealing sheath or plastic, elastomer or another relatively pliant suitable material; a non-sealed flexible metal tube which must withstand the loads developed by the pressure of the fluid flowing in the pipe; one or more armouring plies and at least one external sealing sheath of polymeric material. This type of flexible pipe is often called a "smooth-bore" flexible pipe by those skilled in the art.

Other flexible pipes called "rough-bore" flexible pipes comprise, from the inside to the outside, a non-sealed flexible metal tube, called a carcass, consisting of a section wound with turns which are mutually interlocked, such as, for example, an interlocked strip or an interlocked shaped wire such as a T-shaped, U-shaped, S-shaped or Zeta-shaped wire, an internal sealing sheath of polymeric material, one or more armouring plies capable of withstanding the loads developed by the pressure of the fluid flowing in the pipe and of withstanding the external loads to which the flexible pipe is subjected, and at least one external protective sheath of the polymeric type.

In the latter type of flexible pipe, the internal sealing sheath is continuously extruded directly onto the said carcass which has interstices or separations between the wound turns.

In order to ensure good contact between the internal sealing sheath and the metal carcass, it is necessary for the internal diameter of the internal sealing sheath to be as close as possible and even equal to the external diameter of the flexible metal carcass.

During manufacture of a flexible pipe of the rough-bore type, the internal sealing sheath, which is extruded onto the metal carcass, contracts on the latter during cooling. Depending on the materials used for producing the internal sealing sheath, deformations called "contraction cavities" are observed, after cooling, these contraction cavities appearing on the internal surface of the said internal sealing sheath and, in particular, on either side of the separations between the turns of the metal carcass. Such contraction cavities are due, it would seem, to the differential shrinkage of the material used for the internal sealing sheath because of the variation in the cooling gradient in the thickness of the internal sealing sheath, combined with the effect of the separations of the turns of the metal carcass. This is because, since the extruded sealing plastic sheath is in contact by its internal surface with the metal carcass which is at ambient temperature, the resulting cooling of the said internal surface is very rapid, thereby causing surface irregularities or contraction cavities. This phenomenon is amplified in the separations of the turns of the metal carcass, the differential shrinkage at these points causing local thickness variations in the internal sealing sheath. When the sealing sheath is made of a semicrystalline polymer which is sensitive to the presence of surface defects leading to a failure of the sheath possibly resulting in rupture, such as, for example, PVDF, this very often leads, in operation, to degradation of the said sealing sheath (rupture) which then no longer fulfils its sealing function.

In order to remedy such a drawback and to solve the problem posed by the appearance of contraction cavities, the solution consisting in arranging, between the metal carcass and the internal sealing sheath, a thin sacrificial sublayer of a suitable material, such as PVDF, was discovered and adopted. The internal sealing sheath is then extruded onto the said sacrificial sublayer, but ensuring that there is no intimate bonding or "welding" between the sealing sheath and the sacrificial sublayer so that cracks propagating from the internal surface of the sublayer towards the outside are blocked at the interface of the sealing sheath and the sacrificial sublayer.

The major drawback of this solution is the slip likely to occur between the internal sealing sheath and the sacrificial sublayer near the ends of the flexible pipe, as well as the additional raw-material and conversion costs incurred by the presence of the said sacrificial sublayer.

Other solutions for eliminating the appearance of contraction cavities, or for reducing their effects, have been sought.

The latter solutions, the subject of which is the installation of an internal sealing sheath having, after cooling, a smooth cylindrical internal surface, involve a conformation which is either internal, with as main drawback the creation of longitudinal cracks on the internal surface of the sealing sheath and a fold of material on the external surface, or which is external, with as drawback the complete absence of anchoring of the sealing sheath to the metal carcass.

In the technique of manufacturing flexible pipes of the smooth-bore type, which consists in producing separately the internal sealing sheath, by any suitable means such as extrusion, and the metal carcass, it has been recommended to heat the sealing sheath or the metal carcass once the two elements have been joined together, so that the sealing sheath is rendered or maintained in a plastic form in order to force it to flow plastically into the separations of the turns of the metal carcass. Such manufacturing processes are described in particular in FR-A-74 14 398 (Coflexip) and the addition No. 71 16 880 (IFP).

However, the sole object of these processes is to cause permanent plastic flow of the polymeric sealing sheath between the turns of the metal carcass, after or at the same time as stresses are developed in the internal sealing sheath in order to achieve intimate contact, the stresses developed being, for example, due to compression of the said internal sealing sheath.

In an embodiment described in the patent FR-A-74 14 398, relating to a flexible pipe comprising a peripheral sheath extruded onto an assembly comprising, from the inside to the outside, an internal sealing sheath, a pressure vault, two armouring plies and a metal trellis, it is recommended to heat the assembly before extruding the peripheral sheath so as to maintain at least the internal surface of the said peripheral sheath in the plastic state or more precisely in the thermoplastic state so as, and it is this which is the desired object, to cause the internal surface to flow plastically into the meshes of the metal trellis in order to fill them completely and thus achieve complete fastening of the peripheral sheath to the metal trellis. Under these conditions, it is essential to heat the assembly strongly, to temperatures which are of the order of several hundred degrees Celsius. Such techniques have given such poor results that they were abandoned very rapidly since filling both the interstices of the pressure vault and the meshes of the metal trellis stiffened the pipe and consequently diminished the essential property of flexibility which the pipe must necessarily have.

SUMMARY OF THE INVENTION

The object of the present invention is to propose a process for manufacturing flexible pipes of the rough-bore type, which makes it possible to eliminate the contraction cavities or other surface irregularities liable to appear on the internal surface of the internal sealing sheath.

The subject of the invention is a process for manufacturing flexible pipes, which is characterized in that it consists in heating the flexible metal tube or metal carcass to a temperature below 100° C., upstream of the extrusion means, so as in this way to avoid sudden cooling of the internal surface during extrusion onto the metal carcass.

Another characteristic of the present invention resides in the fact that the process for manufacturing a flexible pipe of the type comprising, from the inside to the outside, a flexible metal tube having a helical winding of turns, an internal sealing sheath arranged around the said flexible metal tube, at least one armouring ply wound around the said internal sealing sheath and at least one external sealing sheath, the internal sealing sheath being extruded onto the flexible metal tube using extrusion means, characterized in that it furthermore consists in heating the said flexible metal tube upstream of the extrusion means and at a temperature below 100° C.

The process is characterized in that the temperature to which the flexible metal tube is heated is less than the temperature for which the material of the internal sealing sheath would fill, by plastic flow, at least 95% of the volume of the spaces between the turns of the said metal carcass.

The process is characterized in that the temperature to which the flexible metal tube is heated is between 20 and 80° C.

The process is characterized in that the temperature is more or less constant over the entire periphery of the flexible metal tube.

The process is characterized in that the heating means consist of an infrared heating device or any other suitable means such as, for example, induction heating means, convection heating means, etc.

The process is characterized in that the temperature to which the flexible metal tube is heated is determined depending on the nature and on the extrusion temperature of the constituent material of the internal sealing sheath and on the thermal properties and geometrical characteristics of the said carcass.

The process is characterized in that the temperature to which the flexible metal tube is heated is determined depending on the speed at which the said flexible metal tube runs through the extrusion means.

The process is characterized in that the flexible metal tube consists of an interlocked strip.

The process is characterized in that the flexible metal tube is produced by a helical winding of wires whose cross-section is, in particular, S-, T-, U- or Zeta-shaped.

That being so, the internal sealing sheath flows plastically only partially into the separations, thereby preserving the flexibility of the pipe while at the same time avoiding the creation of contraction cavities which are a source or defects liable to accelerate deterioration of the internal sealing sheath when cracks appear or are liable to appear during use of the flexible pipe according to the invention.

It should be noted that heating the carcass in no way contributes to the actual fastening of the internal sealing sheath to the carcass, this fastening being achieved downstream of the extrusion head by a partial vacuum in the annular space between the carcass and the internal sealing sheath.

BRIEF DESCRIPTION OF THE DRAWINGS

Other advantages and characteristics of the present invention will appear more clearly on reading the description of an embodiment, as well as on examining the appended drawings in which.

DESCRIPTION OF A PREFERRED EMBODIMENT

Figure 1:
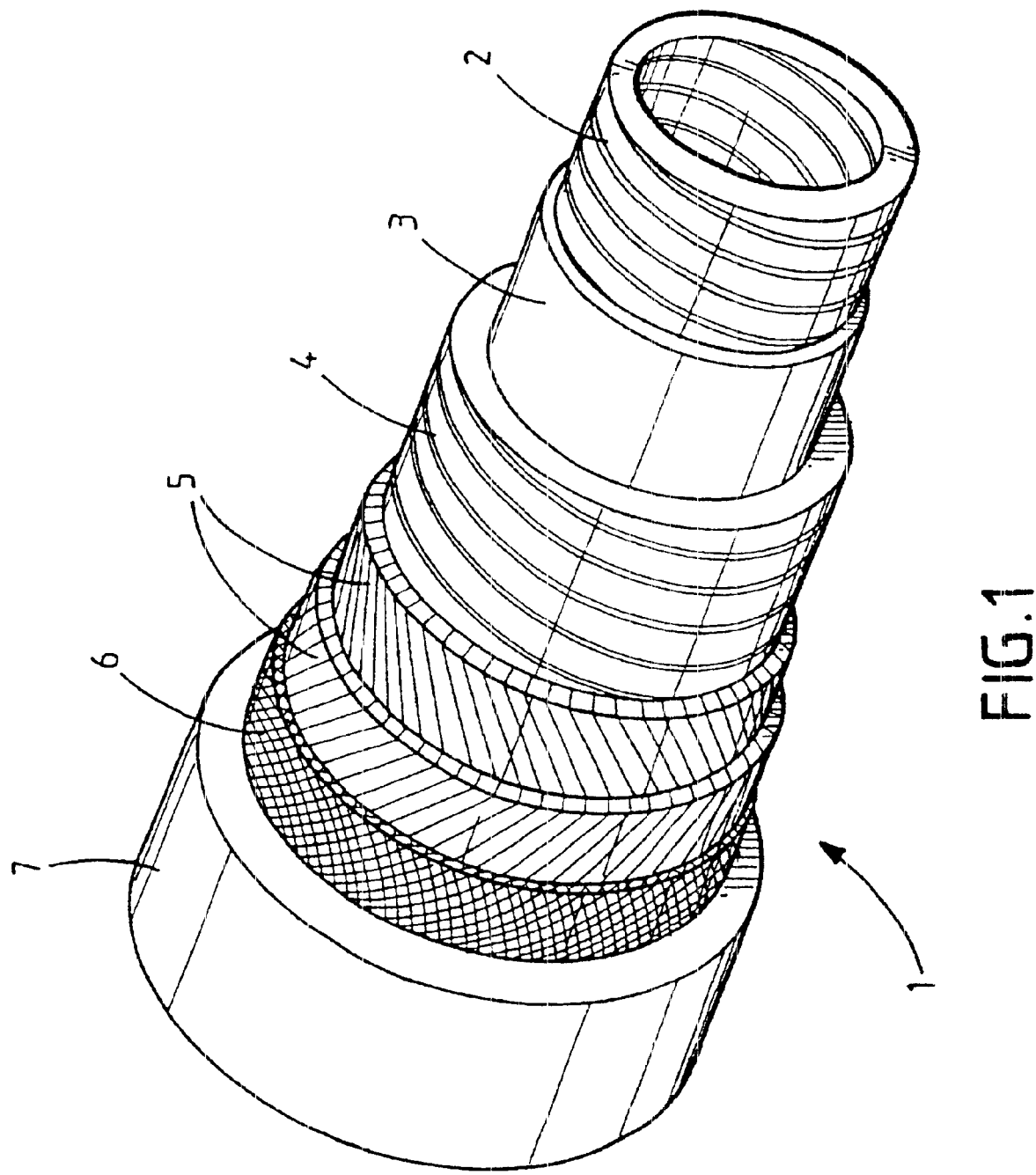
FIG. 1 is a partial and cut-away perspective view of a flexible pipe of the rough-bore type.

A flexible pipe 1 of the rough-bore type, compared with that referred to by the term "smooth-bore", comprises, from the inside to the outside:

a flexible metal tube or carcass 2, produced by helical winding of a metal wire of predetermined cross-section;

an internal sealing sheath 3 placed around the carcass 2;

a pressure vault 4;

one or more armouring plies 5;

optionally, an intermediate tape 6; and an external sealing sheath 7.

The internal sealing sheath 3 and the external sealing sheath 7 are usually obtained by extruding a suitable plastic, such as a polymer, and this is why they are generally referred to as polymeric sheaths.

Figure 4:
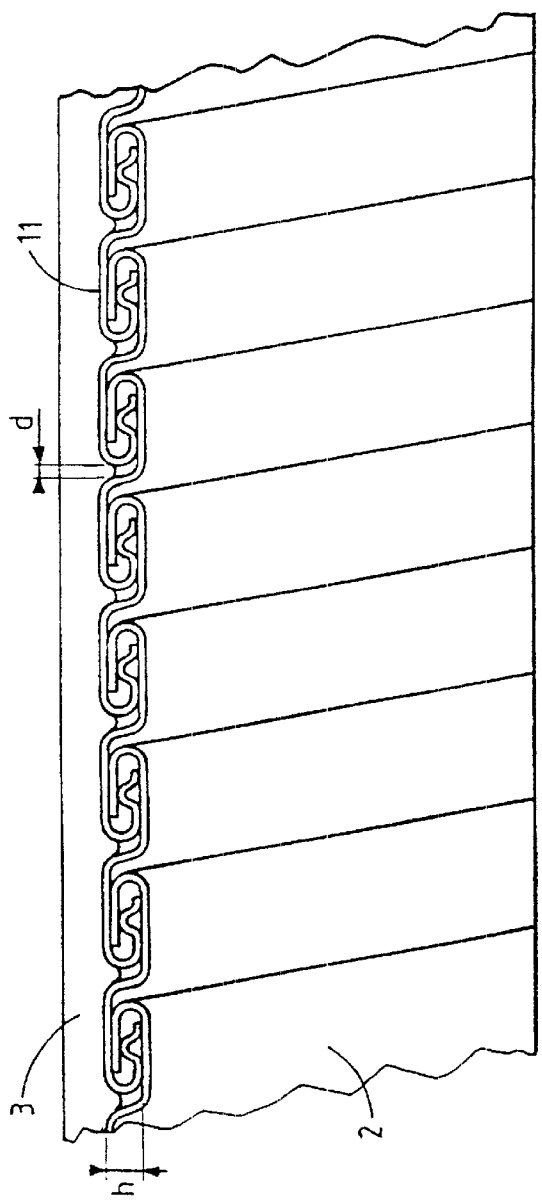
FIG. 4 is a partial sectional view of part of the flexible pipe obtained according to the invention.
Figure 2:
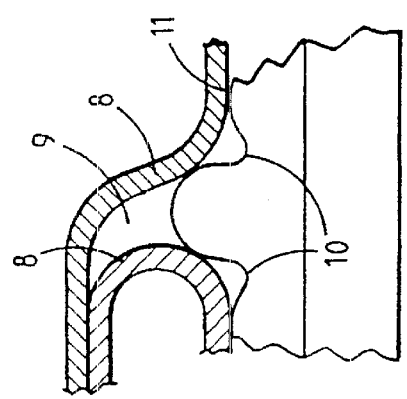
FIG. 2 is a partial sectional view of part of the flexible pipe in FIG. 1, and comprising contraction cavities.

Spaces or separations 9, which may be seen on a larger scale in FIGS. 2 and 4, are left between the consecutive turns 8 of the helical winding produced in order to obtain the carcass 2.

When the internal sealing sheath 3 is extruded onto the metal carcass 2, the extruded polymeric sheath 3 penetrates, by plastic flow, into the spaces 9 and contracts onto the carcass 2 upon cooling, causing, in particular, contraction cavities 10 which are irregularities appearing on the internal surface 11 of the said sheath 3. This is because the plastic sheath leaves the extruder at a temperature which is of the order of several hundred degrees Celsius, while the carcass 2 is at ambient temperature, which may vary from −10° C. to +40° C. depending on the place where the manufacture of the flexible pipe 1 is carried out. The sudden contact of the extruded material on the metal carcass causes sudden cooling of the internal surface 11 of the sheath 3 and consequently the formation of contraction cavities 10, in particular in the separations 9 between the turns 8, these contraction cavities being due to the differential shrinkage of the plastic (variation in the cooling gradient in the thickness of the sheath combined with the effect of the separations between the turns of the carcass). The contraction-cavity phenomenon is magnified at the separations 9 between the turns 8 of the carcass 2, the differential shrinkage, at these points, leading to local variations in the thickness of the sheath 3.

When the material of the sheath 3 is a semi-crystalline polymer sensitive to the presence of surface defects leading to a failure of the sheath possibly resulting in rupture, such as, for example, PVDF, this often leads, in use (bending and thermal cycling), to degradation of the sealing sheath 3 possibly resulting in complete rupture of the said sealing sheath which then no longer fulfils its sealing function. Sometimes, the said sealing sheath may rupture when cracks propagate right through the thickness of the sealing sheath 3 because of the presence of the contraction cavities 10.

Figure 3:
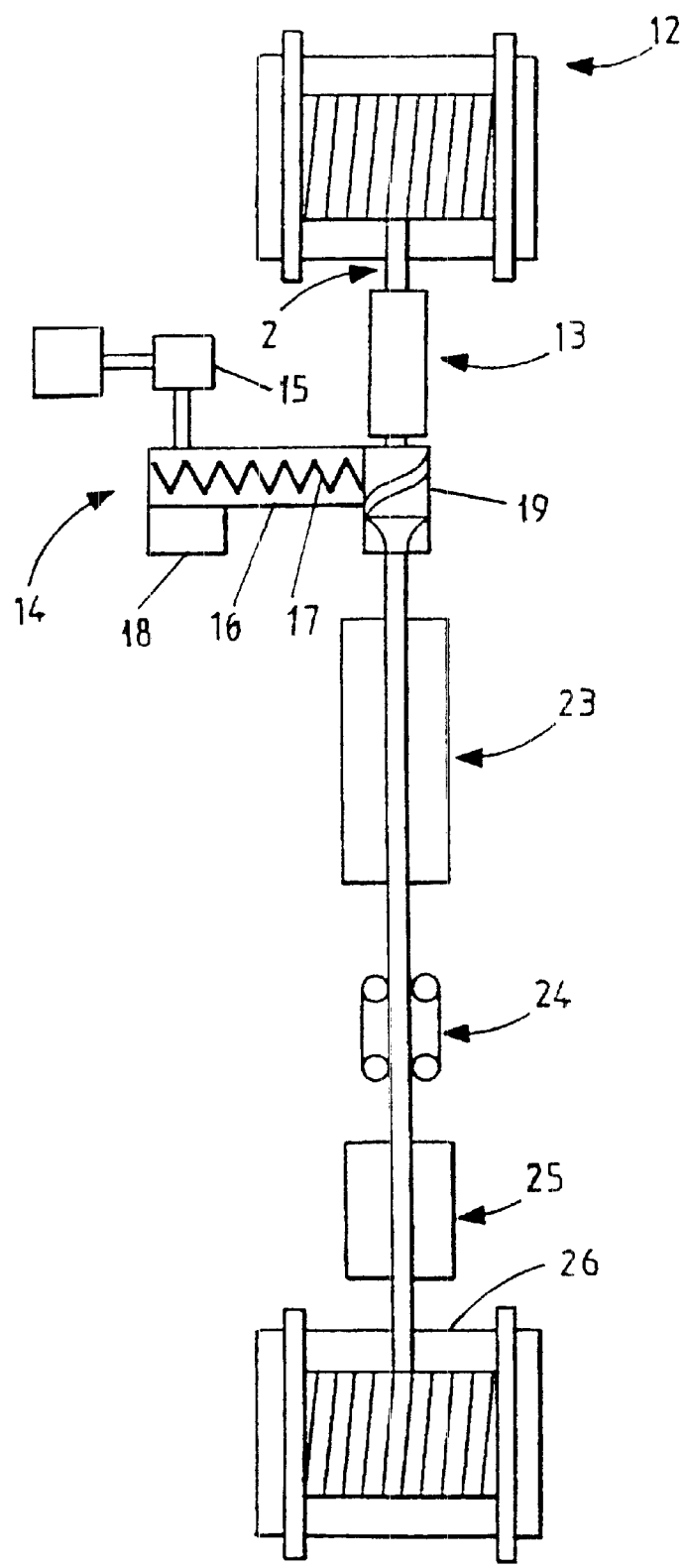
FIG. 3 is a synoptic representation of the means for implementing the process according to the invention.

FIG. 3 shows a synoptic diagram of the means for implementing the process according to the invention.

The carcass 2 is drawn from a reel 12 and passes through a heating oven 13 in which it is heated to a temperature of between 20 and 90° C., depending in particular on the nature of the constituent material of the internal sealing sheath 3 which is extruded by the extrusion means denoted in their entirety by the reference 14 and comprising, in particular, a store of plastic 15, such as PVDF, which is connected to an extruder 16, for example of the type having a screw 17 driven in rotation by a motor 18, and an extrusion head 19.

According to the invention, the heating oven 13 is located upstream of the extrusion head 19 so that when the carcass 2 leaves the extruder head 19 it is at the defined temperature. Thus, when the plastic is extruded onto the carcass, in the extrusion head 19, sudden cooling of the sheath 3 on contact with the carcass 2 is avoided. In addition, the temperature of the carcass 2 is defined so that the internal sheath which is at a high temperature, greater than 200° C., fills only some of the separations 9 between the turns 8. An important characteristic of the invention is not to allow filling, by plastic flow, of the said separations 9, as otherwise the carcass 2 would lose some of its flexibility. In fact, during tests, it was noticed that by using, for example, a plastic such as that denoted by the reference KYNAR from Ato, heating the carcass 2 between 30 and 50° C. caused limited plastic flow into the separations 9 of the turns, but surface defects or contraction cavities at the edge of the separations would be likely to cause premature sealing failure. Heating between 50 and 70° C. causes greater, but acceptable, plastic flow in order to give the pipe good flexibility without the appearance of surface defects or contraction cavities. A temperature of the carcass 2 between 75 and 90° C. causes complete filling of the separations 9 and even of the lateral interstices between the turns 8. This means that, in the case of the material used above, the temperature to which the carcass 2 is heated must be between 50 and 70° C. so as to limit the plastic flow of the material to a certain depth into the separations 9 while preventing the formation of contraction cavities.

The carcass 2 and the internal sealing sheath 3 next pass through a cooling station 23. The run speed of the carcass 2 is ensured by a caterpillar haul-off unit 24 and is determined, in particular, by the productivity chosen. The heating means are determined depending on the manufacturing parameters, such as the run speed of the carcass, the diameter of the flexible pipe, etc.

A device 25 for checking the thickness of the sealing sheath 3 is provided downstream of the caterpillar haul-off unit 24, the carcass coated with the internal sealing sheath being stored on a take-up reel 26.

It is possible to control the regulating and feedback-control loop for the heating oven 13 by means of a sensor, for example of the infrared type having a fibre-optic measurement tap-off which is housed in the extrusion head. In this way, the temperature of the carcass is determined not only depending on its run speed but also depending on the temperature of the extruded material and on the thermal characteristics of the metal used for making the carcass.

By virtue of the present invention, the bonding of the internal sealing sheath 3 to the metal carcass 2 is free of contraction cavities, as shown in FIG. 4, in which it may be seen that the sheath 3 between the turns 8 of the carcass 2 flows plastically only partly into the separations 9 of the internal surface 11 of the sheath 3, the said sheath being perfectly uniform on the external surface of the turns 8 of the said carcass, which carcass may be made from wires whose cross-section may be, for example, S-, T-, U- or Zeta-shaped.

Likewise, the heating means 13 will be adapted depending on the materials used and may be of the infrared or convection type or may be any other heating means known per se.

Using various sheaths, tests have been carried out and these are summarized in the tables below.

| 1st case: | |
|---|---|
| Flexible pipe: | 6 inch internal diameter |
| Carcass: | stainless steel 304 interlocked strip |
| Sheath: | PVDF, KYNAR HDC P 900 |
| Oven: | two infrared bars, power 7.5 kW (×2) |
| Ambient temperature: | 20° C. |

| PARAMETERS | TEST No. 1 | TEST No. 2 | TEST No. 3 |
|---|---|---|---|
| Run speed, m/min | 5 | 1 | 3 |
| Strip temperature, ° C. | 85 | 60 | 35 |
| Extrudate temperature, ° C. | 215 | 225 | 250 |
| Screw rotation speed, rev/min | 10 | 20 | 60 |
| RESULT | POOR Complete filling of the separations | GOOD | POOR Presence of contraction cavities |

| 2nd case: | |
|---|---|
| Flexible pipe: | 6 inch internal diameter |
| Carcass: | stainless steel 304 interlocked strip |
| Sheath: | PVDF, SOLEF 10/15 from Solvay |
| Oven: | two infrared bars, power 7.5 kW (×2) |
| Ambient temperature: | 20° C. |

| PARAMETERS | TEST No. 1 | TEST No. 2 | TEST No. 3 |
|---|---|---|---|
| Run speed, m/min | 5 | 1 | 3 |
| Strip temperature, ° C. | 85 | 60 | 35 |
| Extrudate temperature, ° C. | 215 | 225 | 250 |
| Screw rotation speed, rev/min | 10 | 20 | 60 |
| RESULT | POOR Complete filling of the separations | GOOD | GOOD |

It appears from these tables that the manufacturing parameters must be chosen depending on the nature of the constituent material of the sheath and that, with reduced run speeds, good results are obtained with reduced temperatures.

What is claimed is:

1. A process for manufacturing flexible pipe, wherein the flexible pipe comprises, from inside to outside, a flexible metal tube having helical winding turns helically wound to define spaces between the helical winding turns of the flexible metal tube and the flexible metal tube is an innermost element of the flexible pipe, an internal sealing sheath around the flexible metal tube wherein the material of the internal sealing sheath exhibits plastic flow when heated, an armoring ply wound around the internal sealing sheath, and an external sealing sheath around the armoring ply;

the method including moving the flexible metal tube lengthwise from upstream to downstream past an extrusion head;

extruding the internal sealing sheath onto the flexible metal tube at the extrusion head; and before the extruding, heating the flexible metal tube at a location upstream of the extrusion head to an elevated temperature which is below 100° C. and high enough to avoid contraction cavities in the internal sheath due to differential shrinkage of the material of the internal sealing sheath caused by sudden cooling of the internal surface of the internal sealing sheath on the flexible tube during extrusion and below a temperature at which the material of the internal sealing sheath would fill, by plastic flow, at least 95% of the volume of the spaces between the helical winding turns of the flexible metal tube for preserving the flexibility of the flexible pipe;

applying an armoring ply wound around the internal sealing sheath; and applying an external sealing sheath around the armoring ply.

2. The process of claim 1, wherein the elevated temperature to which the flexible metal tube is heated is in the rage between 20° and 80° C.

3. The process of claim 1, wherein the elevated temperature to which the flexible metal tube is heated is constant over the entire periphery of the flexible metal tube.

4. The process of claim 1, wherein the heating comprises infrared heating.

5. The process of claim 1, wherein the elevated temperature to which the flexible metal tube is heated is dependent upon the nature of the material of the internal sealing sheath and upon the dimension of the spaces between the helical winding turns of the flexible metal tube.

6. The process of claim 1, wherein the flexible metal tube comprises an interlocked helically wound strip.

7. The process of claim 1, wherein the flexible metal tube comprises a helically winding of wires having a cross section of S-, T-, U- or Zeta-shaped.

8. A process for manufacturing flexible pipe, comprising, forming a flexible metal tube by helically winding turns of metal tube forming material wherein the helically wound turns are of such shape and position as to define some spaces between the turns of the flexible metal tube;

extruding an internal sealing sheath around the flexible metal tube at an extrusion head;

moving the flexible metal tube lengthwise from upstream to downstream past the extrusion head at which the internal sealing sheath is extruded onto the flexible metal tube;

before the extruding, heating the flexible metal tube upstream of the extrusion head to a first temperature which is high enough to avoid contraction cavities in the internal sheath due to differential shrinkage of the material of the internal sealing sheath caused by sudden cooling of the internal surface of the internal sealing sheath on the flexible tube during extrusion, the first temperature is also less than a second temperature at which the material of the internal sealing sheath would fill by plastic flow at least 95% of the volume of spaces between the helically wound turns of the flexible metal tube before the extruding of the material of the internal sealing sheath on the heated flexible metal tube;

applying an armoring ply around the internal sealing sheath; and applying an external sealing sheath around the armoring ply.

9. The process of claim 8, further comprising after extruding the internal sealing sheath around the flexible metal tube, and before applying an armoring ply around the internal sealing sheath, fastening the internal sealing sheath to the flexible metal tube after the flexible metal tube has moved away from the extrusion head by applying a partial vacuum in an annular space between the flexible metal tube and the internal sealing sheath.

10. A process for manufacturing flexible pipe, wherein the flexible pipe comprises, from the inside to the outside, a flexible metal tube having helical winding turns, the helical winding turns define spaces between the helical winding turns of the flexible metal tube and the flexible metal tube is an innermost element of the flexible pipe, an internal sealing sheath around the flexible metal tube wherein the material of the internal sealing sheath exhibits plastic flow when heated, an armoring ply wound around the internal sealing sheath, and an external sealing sheath around the armoring ply;

the method including moving the flexible metal tube lengthwise from upstream to downstream past an extrusion head;

extruding the internal sealing sheath onto the flexible metal tube at the extrusion head;

before the extruding, heating the flexible metal tube at a location upstream of the extrusion head to an elevated temperature which is below 100° C. and high enough to avoid contraction cavities in the internal sheath due to differential shrinkage of the material of the internal sealing sheath caused by sudden cooling of the internal surface of the internal sealing sheath on the flexible tube during extrusion and low enough below a temperature at which the material of the internal sealing sheath would completely fill, by plastic flow, the volume of the spaces between the helically winding turns of the flexible metal tube for preserving the flexibility of the flexible pipe;

applying an armoring ply wound around the internal sealing sheath; and applying an external sealing sheath around the armoring ply.

11. A process for manufacturing flexible pipe, comprising, forming a flexible metal tube by helically winding turns of metal tube forming material wherein the helically wound turns are of such shape and position as to define some spaces between the turns of the flexible metal tube;

extruding an internal sealing sheath around the flexible metal tube at an extrusion head;

moving the flexible metal tube lengthwise from upstream to downstream past the extrusion head at which the internal sealing sheath is extruded onto the flexible metal tube;

before the extruding, heating the flexible metal tube at a location upstream of the extrusion head to an elevated temperature which is below 100° C. and high enough to avoid contraction cavities in the internal sheath due to differential shrinkage of the material of the internal sealing sheath caused by sudden cooling of the internal surface of the internal sealing sheath on the flexible tube during extrusion and low enough below a temperature at which the material of the internal sealing sheath would completely fill, by plastic flow, the volume of the spaces between the helically winding turns of the flexible metal tube for preserving the flexibility of the flexible pipe;

applying an armoring ply wound around the internal sealing sheath; and applying an external sealing sheath around the armoring ply.

* * * * *